US005956482A

United States Patent [19]
Agraharam et al.

[11] Patent Number: 5,956,482
[45] Date of Patent: Sep. 21, 1999

[54] MULTIMEDIA INFORMATION SERVICE ACCESS

[75] Inventors: Sanjay Agraharam, Marlboro; Mehmet Reha Civanlar, Middletown; Barin Geoffry Haskell, Tinton Falls; Ashok K. Kuthyar, Holmdel; Robert Edward Markowitz, Glen Rock; Robert F. Mortenson, Chatham, all of N.J.; Carlos Alberto Perea, Bethlehem, Pa.; Ram S. Ramamurthy, Manalapan, N.J.; Kenneth H. Rosen, Middletown, N.J.; Peter H. Stuntebeck, Little Silver, N.J.

[73] Assignee: AT&T Corp, Middletown, N.J.

[21] Appl. No.: 08/648,260

[22] Filed: May 15, 1996

[51] Int. Cl.$^6$ ................................................. H04L 12/00
[52] U.S. Cl. ........................ 395/200.33; 395/200.32; 395/200.49; 345/326; 345/327; 345/329
[58] Field of Search ................ 395/200.32, 200.33, 395/200.47, 200.49, 200.57, 200.68, 200.61, 200.8; 370/390, 401, 420; 348/7, 12, 15, 16, 17; 345/326, 327, 329

[56] References Cited

U.S. PATENT DOCUMENTS 5,560,038   9/1996   Haddock ............................ 395/200.66
5,623,690   4/1997   Palmer et al. ........................... 395/806

OTHER PUBLICATIONS

Eric Hermann, "Teach Yourself CGI Programming with PERL In A Week" (Sams Publishing Jan. 1996).
Mark J. Koenig and Martin J. Welt, "MCUs Help Take The Worry Out of Being There" AT&T Technology Products, Systems and Services vol. 9, No. 4, Winter 1994; (pp. 12–15).
Robert M. Howe III, "Vistium Products Give Another Point of View" AT&T Technology Products, Systems and Services vol. 9, No. 4, Winter 1994; (pp. 18–21).

William J. Clark, "Multipoint Multimedia Conferencing" IEEE Communications Magazine; May 1992; (pp. 44–50).

*Primary Examiner*—Thomas Peeso

[57] ABSTRACT

Real time delivery of multimedia information accessed either through the Internet, or otherwise, simultaneously, or sequentially time delayed to one more users, is enabled by delivering the multimedia information over a switched network via a multipoint control unit. A client establishes a connection with a server, or other remote location where desired multimedia information is resident, identifies the desired multimedia information and provides client information identifying the locations of the users. The client information may include the telephone numbers or other access numbers of each of the multiple users. The multimedia information is then delivered by a multimedia server to a bridging apparatus through a switched network guaranteeing high quality of service, secure connection and billing control. Connecting one or more users to a live agent is also made possible by providing the telephone numbers of the users and the live agent directly to the multipoint control unit. The delivery of the multimedia information can be secured by comparing the client information to a segmented "to call" list to determine whether the client is authorized to receive the requested multimedia information. Alternatively, or in addition, security can be implemented by mounting a video camera at the client's endpoint and connecting a database running face recognition software to the multimedia server. The multimedia server's call to the user triggers the camera to take a picture of the user. The selected content is restricted to authorized users by comparing the picture to pictures of authorized faces stored in the database.

20 Claims, 3 Drawing Sheets

MULTIMEDIA INFORMATION SERVICE ACCESS

The present application is related to U.S. patent application Ser. No. 08/402,664 filed on Mar. 13, 1995, and is entitled "Client-Server Architecture Using Internet and Public Switched Networks." These two applications are co-pending and commonly assigned.

TECHNICAL FIELD

This invention relates to real time multimedia information broadcast over circuit switched networks and, more particularly, provides a client-server architecture utilizing the Internet and public switched networks and a method for using the same for the delivery of real time multimedia information to one or simultaneously to more than one end user.

BACKGROUND OF THE INVENTION

The Internet's global and exponential growth for searching for information sources is common knowledge today. The Internet is implemented using a large variety of connections between millions of computers. The recent developments on information navigation software and user interfaces, such as Netscape Navigator, coupled with a continuously growing number of public access providers are making the Internet a fundamental component of the information age, if not the information super highway itself.

The usage and demands on the network capabilities, however have frustrated many users in attempting to view large bodies of information. Video and high fidelity audio are particularly prone to service degradation. Contention for bandwidth to transport information can delay or fragment the delivery of blocks of information. Large image files can suffer from annoying delay in their delivery and storage and memory capacity of desktop computers and workstations pose limitations to the amount of information that can be downloaded. For example, downloading a five minute video file can take more than sixty minutes, especially when the server from which the video is obtained is located in a distant geographic location, and the user would need very large storage capacity.

In addition to the quality of the received information and storage constraints, the Internet raises other concerns, including a guaranteed or consistent quality of service, security, and an easy and flexible mechanism to charge for transactions.

What is desired is a practical way to provide real time multimedia information, accessed through the Internet or otherwise, to one or more users with a guaranteed quality of service, security, and a charge mechanism for handling service requests made over the Internet. Where multiple users are to receive the information, one client should be able to control the temporal manner according to which the information is to be delivered to the multiple users, whether simultaneously or according to a time delay sequence.

SUMMARY OF THE INVENTION

Accordingly, it is an objective of the present invention to provide real time delivery of multimedia information either simultaneously, or according to a time delay sequence, to multiple users. In accordance with the present invention, either through the Internet, or otherwise, a client, the principal user, establishes a connection with a server, or other remote location where desired multimedia information is resident. The client identifies the desired multimedia information, provides client information identifying the location of the multiple users and indicates the desired temporal scheme for delivering the multimedia information to the multiple users. The client information may include the telephone numbers or other access information of each of the multiple users. The multimedia information is then delivered by a multimedia server to a bridging apparatus through a switched network on a circuit connection guaranteeing high quality of service, secure connection and billing control. The bridging apparatus delivers the multimedia information to the multiple users using the telephone numbers provided by the client to the multimedia information server and according to the requested temporal scheme. The multimedia server can also terminate the call after the multimedia information is delivered, or initiate additional transactions.

The client-server architecture of the present invention can be also used to connect one or more users to a live agent. When a user requests a connection to a live agent, the server provides the telephone numbers of the users and the live agent to the bridging apparatus which then controls the multiparty connection.

It is another objective of the present invention to provide means for securing the delivery of multimedia information and the live agent transfer of data in accordance with the present invention. In furtherance of this objective, a first security step includes comparing the client information to a segmented "to call" list to determine whether the client is authorized to receive the requested multimedia information.

A second security step can also be implemented where a client's endpoint is enabled for video telephony. A video camera is mounted at the client's endpoint and a database running face recognition software is connected to the multimedia information server. When the multimedia server calls the client to deliver the requested data, the camera is activated, taking a picture of the client. The picture is compared to a database of authorized faces, thereby enabling the restriction of selected content to authorized viewers only.

DETAILED DESCRIPTION OF THE INVENTION

The present invention enables the simultaneous, or sequential time delay transmission of multimedia information, to one or more users in real time. Multimedia information as used herein includes, although not limited to, recorded and live video and audio clips, image files and text files. By using an ISDN enabled endpoint for video telephony, the multimedia information can be delivered with a guaranteed quality of service, security, and an easy and flexible mechanism to charge for the information and transmission services, even if these features are not available via the means by which the multimedia information was accessed by the client, as for example the Internet.

Figure 1:
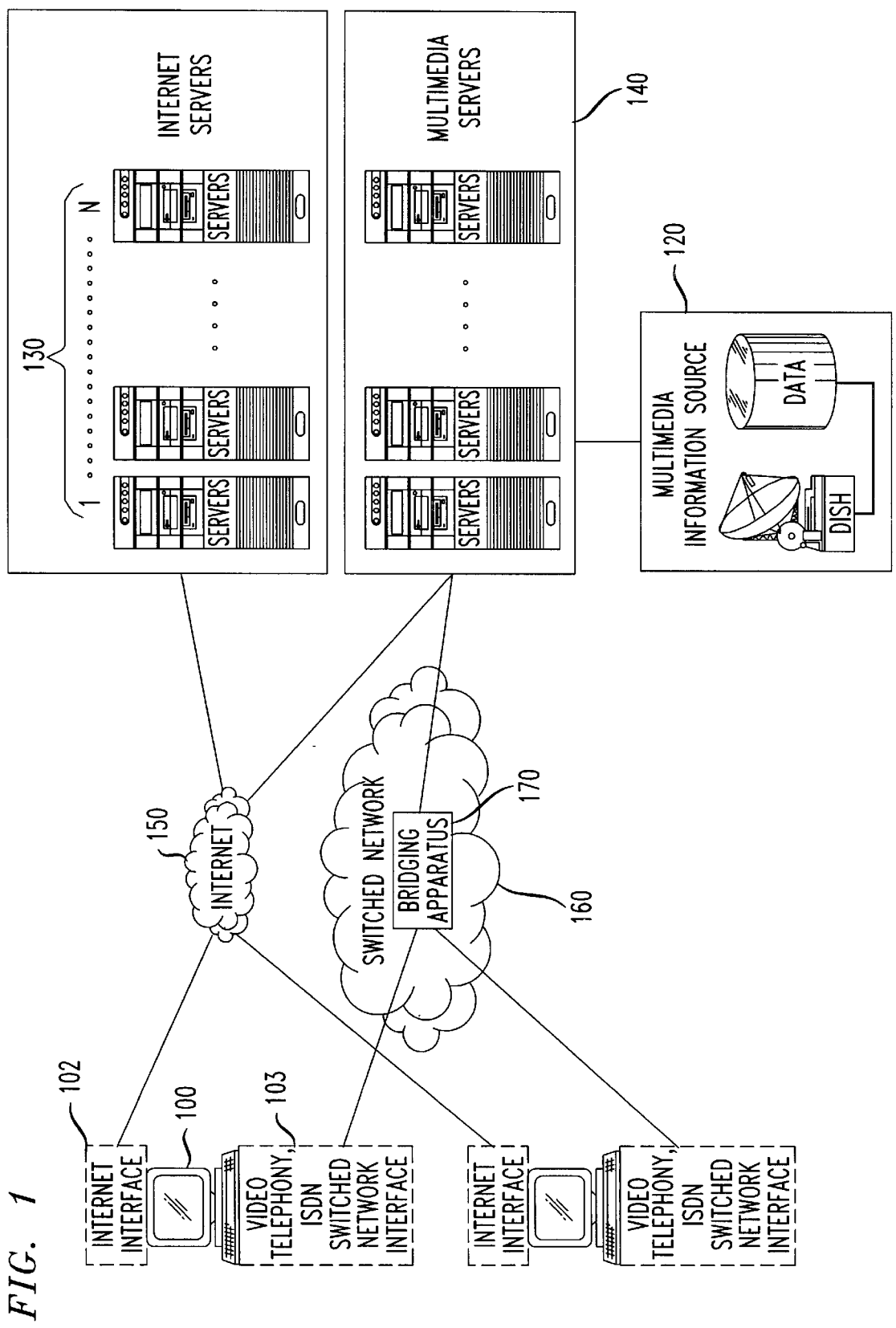
FIG. 1 shows an illustrative client-server architecture for multiparty delivery of multimedia information using the Internet and a public switching network.

Referring to FIG. 1, a client-server architecture is shown where client apparatus 100, may be a personal computer, a workstation, or other similar interface. At the client end two logical network connections or interfaces, 102 and 103 are required. Interface 102 provides a connection to an Internet server to which the user can connect using an appropriate transfer protocol, such as the hyper text transfer protocol ("http") through Internet 150. This connection can be made through a local area network (LAN), through a Serial Line Internet Protocol (SLIP) connection over a modem, or through a Point to Point Protocol (PPP) over an ISDN port. The Internet server will access the multimedia information source based on its address. Alternatively, multimedia information source 120 can be accessed directly via a conventional telephone line, as described below in connection with FIG. 2. The telephone connections can be made either through a private connection or through a public switched telephone network (PSTN).

Interface 103 provides a connection to a public or private switched telephone network through an ISDN port enabled for video telephony. As shown in FIG. 1, the connection to switched network 160 can be made through bridging apparatus 170. A bridging apparatus allows for various temporal schemes for the delivery of information to multiple users, such as simultaneous delivery, or sequentially delivering the information to each user with an arbitrary time delay, by acting as a single node for receiving the requested information and then forwarding the received information to each of the connected end users. One bridging apparatus known to those skilled in the art is the multipoint control unit, more fully described in William J. Clark, "Multipoint Multimedia Conferencing" IEEE Communications Magazine pp. 44–50 (May 1992), and Mark J. Koenig and Martin J. Welt, "MCUs Help Take the Worry Out of Being There" AT&T Technology-Products, Systems and Services, Vol. 9 No. 4 pp 12–15 (Winter 1994), both of which are hereby incorporated by reference as if fully set forth herein.

As stated above, the connection between the client and the switched network is made through an ISDN port enabled for video telephony. One preferred standard for video telephony is H.320, a telecommunications standard for voice, data, video communications used for desktop video services, described in more detail in, Robert M. Howe III, "Vistium Products Give Another Point of View" AT&T Technology-Products, Systems and Services, Vol. 9, No. 4 pp 18–21 (Winter 1994), hereby incorporated by reference as if fully set forth herein.

It should be noted that the two interface connections 102 and 103 are defined at the logical level, that is, client apparatus 100 may have a single physical connection that can connect it to both the Internet 150 and public switched network 160. Generally, the system of FIG. 1 enables a plurality of client computer-based apparatuses to access a plurality of servers 130 which in turn locate and receive the multimedia information through public switched network 160.

The present invention can be used for the real-time delivery of recorded as well as live video and audio. An example of delivering live video and audio to a client includes connecting the client to a live sales agent to respond to the client's questions and to receive product orders.

To enable live service requests, one of the multimedia servers 140 may initiate a call connection over the public switched network 160, using a telephone number provided by the client apparatus 100 as part of the service request, and deliver information for the requested service. This call may be billed by any of the standard call billing methods, e.g., collect or third part billing, etc. For such an application or service, the public switched network 160 provides the billing for the service and transmission as provided in a normal call made over the public switched network 160. Since the connection over the public switched network provides enhanced security, complicated identification mechanisms are not needed.

In one example of using the client-server architecture of FIG. 1 the client, the principal user, will typically use an application such as Netscape Navigator to access http server 130 from his client apparatus 100, via the Internet 150. When the client requests the delivery of information that is preferably not to be delivered over the Internet, or otherwise requires a phone connection, the client will be prompted to provide identification information, if not already provided, and optionally to select a temporal scheme for delivering the information. The identification information may include the client's telephone number. The http server 130 will pass this identification information to multimedia server 140 to place a circuit switched call to the client. The multimedia server includes a video telephony enabled port, such as an H.320 enabled ISDN port. When a server receives a request for an application or service which requires a phone connection, it activates a new process which handles calling the phone number associated with this request. This multimedia server process can run on the same controller operating the http server 130, or it can be run on another machine connected to the first controller, as for example by means of a LAN. This process can be implemented with the Common Gateway Interface (CGI) for which public software implementations are available for http servers. The CGI is an open interface specification that can be obtained from the Internet and is more fully described in Eric Hermann, "Teach Yourself CGI Programming with PERL In A Week" (Sam Publishing January 1996), hereby incorporated by reference herein as if fully set forth herein. Several programs for automatic dialing of PSTN or ISDN numbers are available for various computers, e.g., Intel ProShare and can be used for this purpose. Client apparatus 100 includes a program that accepts incoming phone calls. Such software is also available from many vendors, e.g., Intel ProShare.

The multimedia server 140 retrieves the multimedia information from the multimedia information source 120 and dials the client, or the bridging apparatus as the case may be, and forwards the content accordingly. If bridging apparatus 170 is used, the telephone numbers of the users waiting to receive the requested multimedia information is first forwarded to the bridge 170. The bridging apparatus 170 and multimedia server 140 can be connected over a LAN, a switched network, or other suitable means. The bridging apparatus 170 then dials the users' telephone numbers and delivers the multimedia information to each of the identified users according to the selected temporal scheme. After delivery is complete, either the client apparatus 100 or the multimedia server 140 may terminate the switched network connection. If the client chooses to have the requested information delivered to more than one user simultaneously the multimedia server 140 will wait for the bridging apparatus 170 to establish a connection with each of the users and then transmit the requested information to the bridging apparatus 170. Bridging apparatus 170 then channels the requested information to each of the users.

The client can also choose to have different users receive the content at different times. For example, one user or a group of users may be selected to receive the information at 9:00 AM, with another user or group of users to receive the same information at 9:30 AM. In this embodiment of the present invention, it is preferable for the multimedia server 140 to transmit the information to the bridging apparatus 170 at each of the selected times. Alternatively, the multimedia server 140 could transmit the information to the bridging apparatus 170 once and another server connected to the bridging apparatus 170 could store the information and control the time delayed delivery to the selected users.

The client-server architecture of the present invention allows for multiple http servers to share a single multimedia information server, and for a single http server to be able to access multiple multimedia servers.

In addition to enabling simultaneous real time delivery of multimedia information to multiple users, the client-server architecture of the present invention can also be used to provide a live video and/or audio connection to another party such as a vendor's customer service agent. For example, a client visiting a vendor's web site may place a request to speak with a live agent. The http server will transfer the client's telephone number and the number for the live agent directly to a bridging apparatus which will set up the multipoint multimedia connection between agent and client.

Simultaneous or subsequential time delayed delivery of multimedia information to one or more users according to the present invention is also possible without accessing the multimedia information through the Internet. Instead, a client can place a request for multimedia information over a conventional telephone line, or other non-Internet means, such as placing an order by facsimile. By providing the user's telephone number to a multimedia server, real time multimedia information can be delivered to the user over an ISDN line using H.320.

Figure 2:
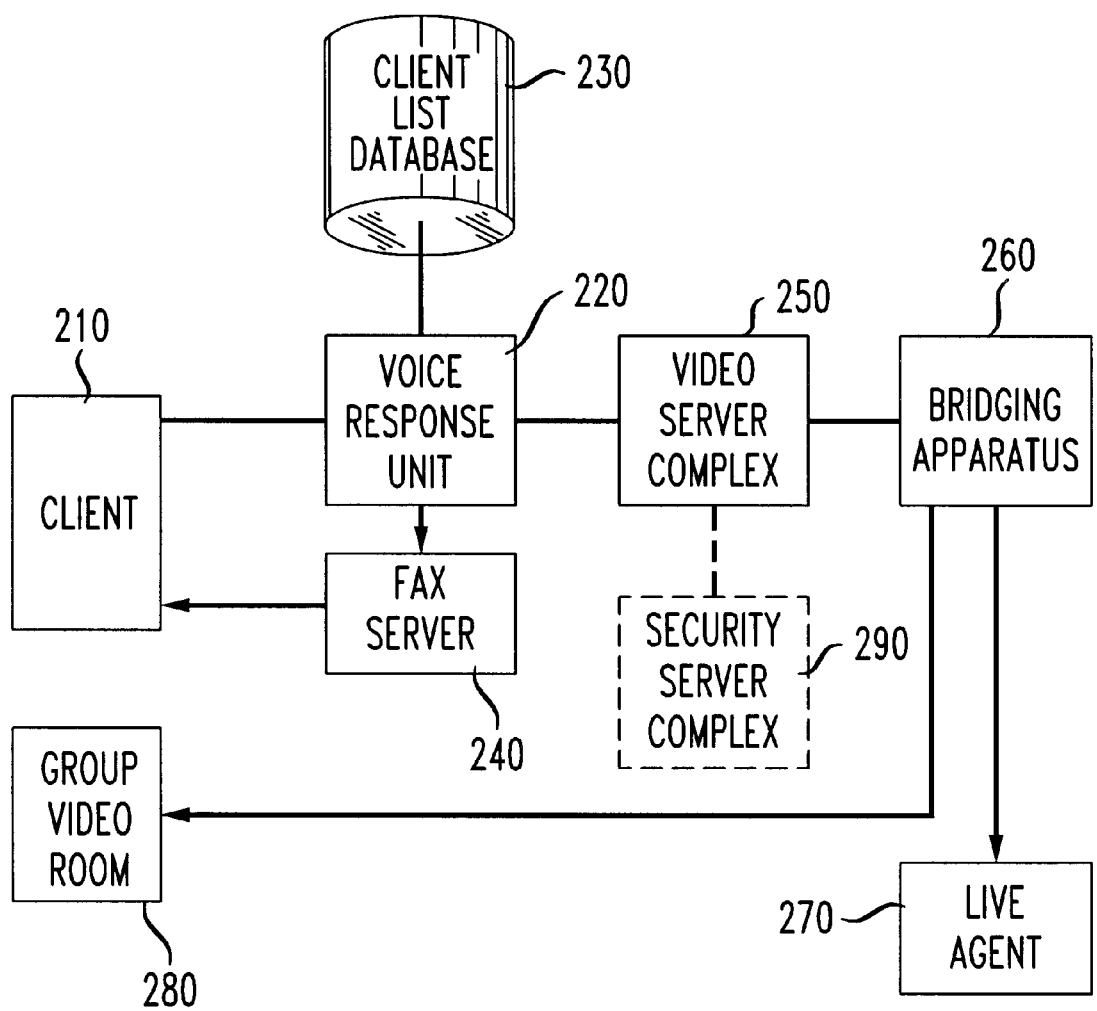
FIG. 2 depicts the architecture used for real time multimedia information delivery according to the present invention by accessing the multimedia information without the Internet.

Referring to FIG. 2, an implementation of the present invention is shown where client 210 places a telephone call to multimedia server 250 and is connected to a Voice Response Unit (VRU) 220. This user is prompted via a menu selection to input a security code, which is compared to a list of authorized codes maintained in database 230. After establishing the user's identity, the user could be guided through a menu selection of available multimedia information content. Alternatively, or in addition, the person could be prompted to input his/her fax number, so that fax server 240 can immediately send a similar or more detailed menu. The user would then transmit his or her selection and the telephone number of Group Video Room 280 or other video receiving apparatus having an ISDN port enabled for video telephony. This in turn would trigger the real-time delivery of the selected multimedia information content. In the same way, as described above simultaneous or sequential time delayed delivery to multiple users through a bridging apparatus, such as bridging apparatus 260, is possible as well.

Figure 3:
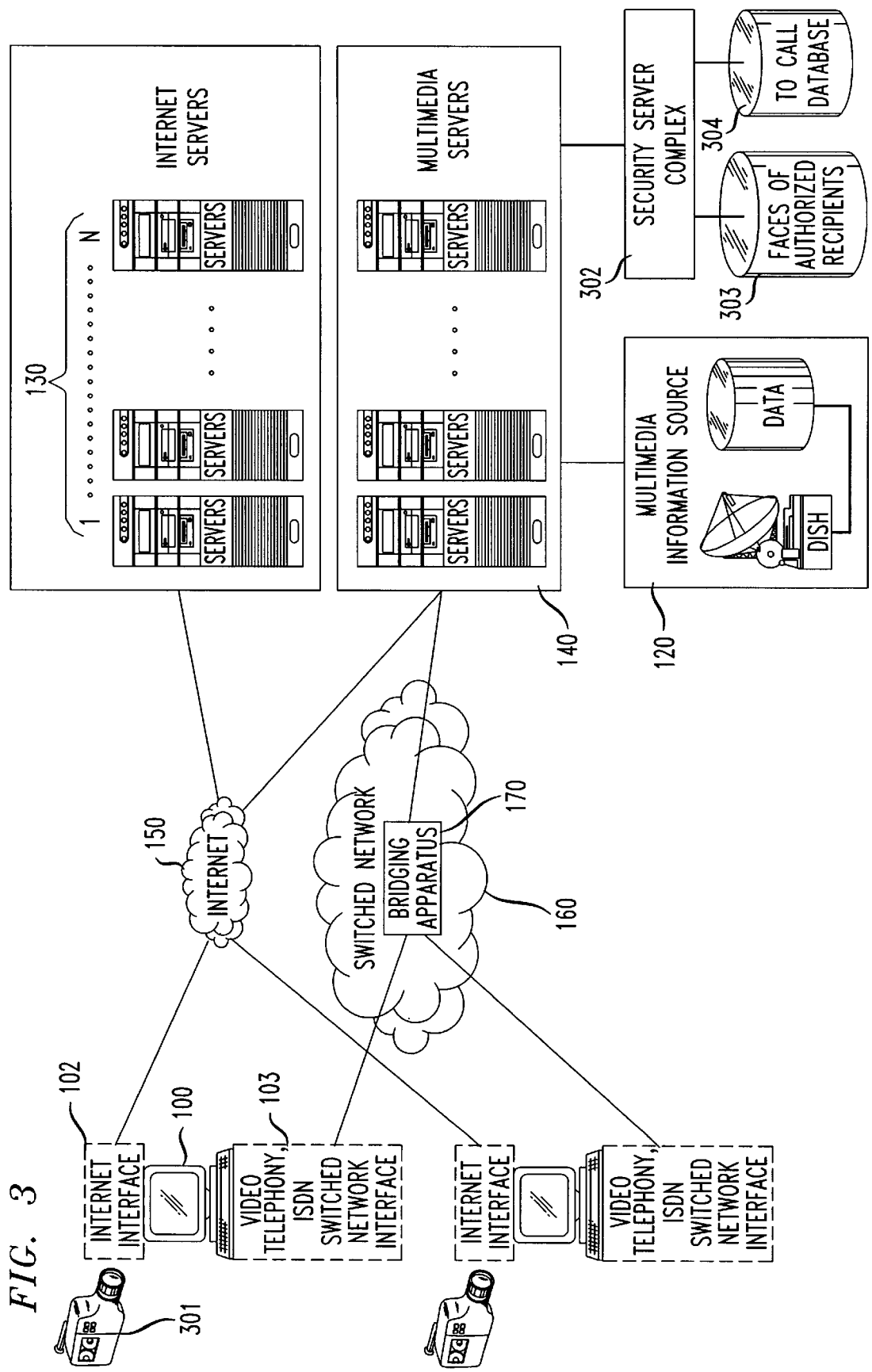
FIG. 3 shows an illustrative client-server architecture for multiparty delivery of multimedia information using the Internet and a public switching network with enhanced security.

Referring to FIG. 3, it is possible to enhance the security of the multimedia information delivery transaction according to the present invention provided by the switched network, by including a database function connected to the multimedia server through security server complex 302, which would have a segmented "to call" list 304. When a client inputs a specific telephone number to receive the multimedia information server 302 queries the "to call" database 304 to verify whether the particular endpoint is authorized to receive that specific information. If the endpoint is not allowed to receive that information, the video call is not connected. A message conveying the lack of authorization and/or the failed connection can be displayed to the client over the Internet connection 150.

It is also possible to enhance the security of the transmission of multimedia information according to the present invention by including a video camera 301 at the client's end. When the multimedia server 140 dials the client's video telephony enabled port, camera 301 is activated which in turn triggers a video capture algorithm on the multimedia server side. In essence a snapshot is taken of the person about to receive the multimedia information. The snapshot can be run through a separate database 303 and security server complex 302 (or 290 as shown in FIG. 2) connected to the multimedia server 140 and run face recognition software. In highly secure applications where specific video content should be viewed by only a select number of people (e.g. future advertising can be viewed, daily rushes from movies in the making can be reviewed, future press announcements can be reviewed, etc.) the system would have the ability to restrict viewing to select users.

The snapshot may also be used to maintain usage statistics, including who viewed what content, when.

The foregoing merely illustrates the principles of the present invention. Those skilled in the art will be able to devise various modifications, which although not explicitly described or shown herein, embody the principles of the invention and are thus within its spirit and scope.

What is claimed is:

1. A method for real time delivery of multimedia information from a remote location to one or more users including a principal user, comprising the steps of establishing a first line of communication between said principal user and said remote location;

requesting a temporal scheme for the delivery of multimedia information from said remote location to each of said users, said temporal scheme relating to the timing and sequence of said delivery of multimedia information to each of said users;

establishing a second line of communication over a switched network between a multimedia server, and a bridging apparatus, said bridging apparatus being connected to each of said users; and delivering in real-time said requested multimedia information to each of said users through said bridging apparatus, according to said temporal scheme.

2. A method according to claim 1 wherein said temporal scheme includes the simultaneous delivery of said requested multimedia information to each of said one or more users.

3. A method according to claim 1 wherein said temporal scheme includes delivering said requested multimedia information to said one or more users in a time delayed sequence.

4. A method according to claim 1 wherein said first line of communication includes establishing an Internet connection.

5. A method according to claim 1 further comprising the step of providing identification information of each of said plurality of users to said multimedia information server by said principal user.

6. A method according to claim 5 wherein said identification information includes one or more telephone numbers for said plurality of users.

7. A method according to claim 1 wherein said switched network is an Integrated Services Digital Network ("ISDN") enabled for multimedia information telecommunications.

8. A method according to claim 7 wherein said ISDN is enabled for H.320.

9. A method according to claim 1 wherein said multimedia information includes live video.

10. A method according to claim 1 wherein said multimedia information includes live audio.

11. A method according to claim 1 wherein said bridging apparatus is a multipoint control unit.

12. A method for connecting a user on the Internet to a live agent, comprising the steps of:
- establishing a first line of communication between said user and an Internet server;
- receiving a request from said user to be connected to said live agent;
- requesting said user to provide identification information to said Internet server, said identification information including a telephone number at which a switched network call can be placed to said user;
- receiving said identification information;
- providing said user identification information to a bridging apparatus;
- connecting said live agent to said bridging apparatus; and
- placing a switched network call to said user from said bridging apparatus thereby connecting said user to said live agent.

13. A method for securing the delivery of multimedia information by a multimedia server to a user requesting said multimedia information over a switched network, comprising the steps of:
- maintaining a database of user identification and corresponding authorization for receiving said multimedia information;
- receiving identification information from said user at said multimedia server;
- comparing at said multimedia server said received identification information with said user identification and corresponding authorization maintained on said database; and
- delivering said multimedia by said multimedia server information to said user only if said comparison indicates said user is authorized to receive said multimedia information.

14. A method for securing the delivery of multimedia information from a multimedia server to a user end point over an ISDN switched network enabled for video telephony, comprising the steps of:
- maintaining a database of pictures of users authorized to receive said multimedia information;
- activating a video camera located at said user endpoint to take a picture of said user prior to delivering said multimedia information;
- triggering a video capture algorithm at said multimedia server to capture a picture of said user;
- comparing said captured picture of said user to said database of pictures of users authorized to receive said multimedia information; and
- delivering said multimedia information to said user only if said comparison indicates said user is authorized to receive said multimedia information.

15. A client-server architecture for real-time delivery of multimedia information from a remote location to one or more users including a principal user, comprising:
- a first line of communication between said principal user and said remote location;
- a multimedia information server for accessing said multimedia information from said remote location;
- a bridging apparatus for delivering said multimedia information to each of said plurality of users according to a selected temporal scheme, said temporal scheme relating to the timing and sequence of said delivery of multimedia information to each of said users; and
- a second line of communication over a switched network between said multimedia server and said bridging apparatus for real-time delivery of said requested multimedia information to said bridging apparatus, whereby said bridging apparatus delivers said requested multimedia information to said one or more users.

16. A client-server architecture according to claim 15 wherein said temporal scheme includes means for the simultaneous delivery of said requested multimedia information to each of said one or more users.

17. A client-server architecture according to claim 15 wherein said temporal scheme includes means for delivering said requested multimedia information to said one or more users in a time delayed sequence.

18. A client-server architecture for connecting a user on the Internet to a live agent, comprising:
- a first line of communication between said user and an Internet server;
- means for requesting a connection to a live agent;
- means for providing identification information of said user to said internet server, said identification information including a telephone number at which a circuit switched call can be placed to said user;
- means for providing said user identification to a bridging apparatus;
- means for connecting said live agent to said bridging apparatus; and
- a switched network for placing a switched network call to said user from said bridging apparatus thereby connecting said user to said live agent.

19. A system for securing the delivery of multimedia information to a user requesting said multimedia information over a switched network, comprising:
- a database of user identification and corresponding authorization for receiving said multimedia information;
- means for receiving identification information of said user;
- means for comparing said received identification information with said user identification and corresponding authorization maintained on said database; and
- means for restricting the delivery of said requested multimedia information to said user if said comparison indicates that said user is not authorized to receive said multimedia information.

20. A system for securing the delivery of multimedia information from a multimedia server to a user endpoint over an ISDN switch network enabled for video telephony, comprising;
- a database of pictures of users authorized to receive said multimedia information;
- a video camera located at said user endpoint;
- means for activating said video camera prior to delivering said multimedia information;
- means for triggering a video capture algorithm at said multimedia server to capture a picture of said user;
- means for comparing said captured picture of said user and said database of pictures authorized to receive said multimedia information; and
- means for restricting the delivery of said multimedia information to said user if said comparison indicates that user is not authorized to receive said multimedia information.

* * * * *